May 5, 1970

J. E. HYLAN ET AL — 3,509,981

MAGNETIC CONTROL APPARATUS FOR POSITIONING MACHINE
ELEMENTS TO MULTIPLE OPERATING POSITIONS

Filed Aug. 7, 1967

INVENTORS.
JOHN E. HYLAN
ALLAN F. WALTER

BY *Samuel Lane*

ATTORNEY

INVENTORS.
JOHN E. HYLAN
ALLAN F. WALTER
BY
Samuel Kane
ATTORNEY

United States Patent Office 3,509,981
Patented May 5, 1970

---

3,509,981
MAGNETIC CONTROL APPARATUS FOR POSITIONING MACHINE ELEMENTS TO MULTIPLE OPERATING POSITIONS
John E. Hylan, Birmingham, Mich., and Allan F. Walter, Exton, Pa., assignors to Burroughs Corporation, Detroit, Mich., a corporation of Michigan
Filed Aug. 7, 1967, Ser. No. 658,803
Int. Cl. B41j 19/00
U.S. Cl. 197—82                                           2 Claims

ABSTRACT OF THE DISCLOSURE

The control apparatus of the invention includes two magnets, one of which is fixed and the other movable. The movable magnet is mounted for controllably moving a machine element to a selected one of a plurality of positions at which a machine operation is to take place. At least one of the magnets is an electromagnet constructed of a plurality of individual interconnected coils, with each group of adjacent coils defining and associated with one of the machine operating positions. A switching means is operable for connecting at least a selected one of the coil groups to a source of electrical energy so that its resulting magnetic flux interacts with the magnetic flux of the other magnet whereby relative movement between the magnets results so that the machine element is moved by the movable magnet to a selected machine operating position.

BACKGROUND OF THE INVENTION

This invention relates generally to apparatus for controlling the movements of machine elements and more particularly to magnetic control apparatus for positioning and detenting in position carriages and other elements of printing machines.

Control of printing machine carriage mechanisms is generally effected by means of elements utilizing mechanical motion; that is, tapes, lead screws, racks and pinions, springs, etc. In machines employing these devices, the carriage mechanism is usually brought into final position by means of a mechanical detent.

SUMMARY OF THE INVENTION

An object of the invention is to provide a control apparatus for moving machine elements magnetically.

Another object of the invention is to provide a control apparatus for detenting a movable machine element at an operating position.

More specifically, it is another object of the invention to provide a control apparatus for controlling the escapement and tabbing movements of printing machine carriages.

Still another more specific object of the invention is to provide a control apparatus which will permit bidirectional escapement and tabbing movements of such carriages.

In accordance with the above objects and considered first in one of its broader aspects, apparatus for positioning and magnetically locking a movable machine carriage at a selected one of a plurality of operating positions in accordance with the invention may comprise a carriage magnet secured to the carriage and a fixed electromagnet having portions each energizable so as to be magnetically coupled to and in line with the carriage magnet and defining one of the operating positions. Means is provided for energizing at least a selected one of the electromagnet portions so that its magnetic flux interacts with the magnetic flux of the carriage magnet to magnetically position and lock the carriage at the selected operating position.

The invention will be more clearly understood when the detailed description of the preferred embodiments thereof, which follows shortly, is read in conjunction with the accompanying drawing which is described below.

DESCRIPTION OF THE PREFERRED EMBODIMENTS

Figure 1:
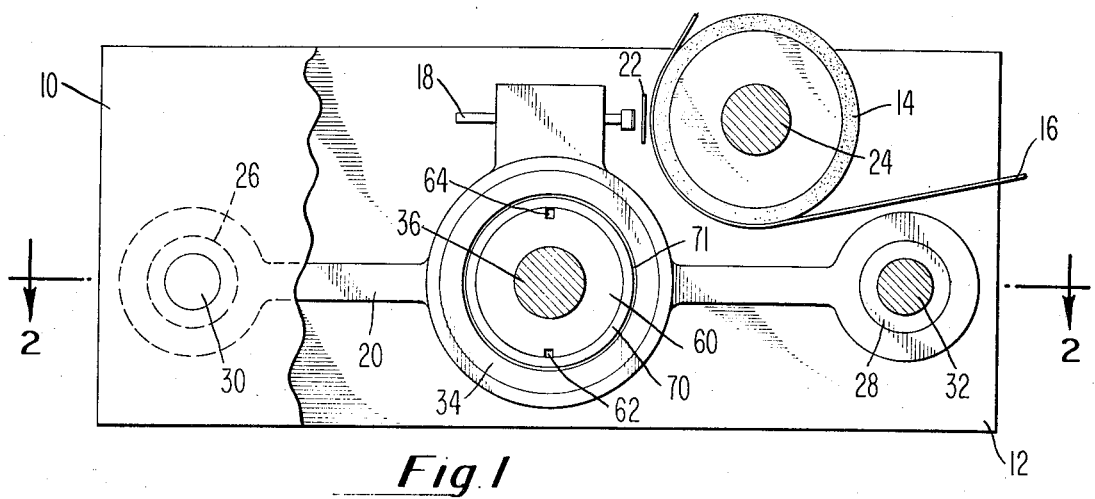
FIG. 1 is an end view of a printing machine apparatus constructed in accordance with the invention.
Figure 2:
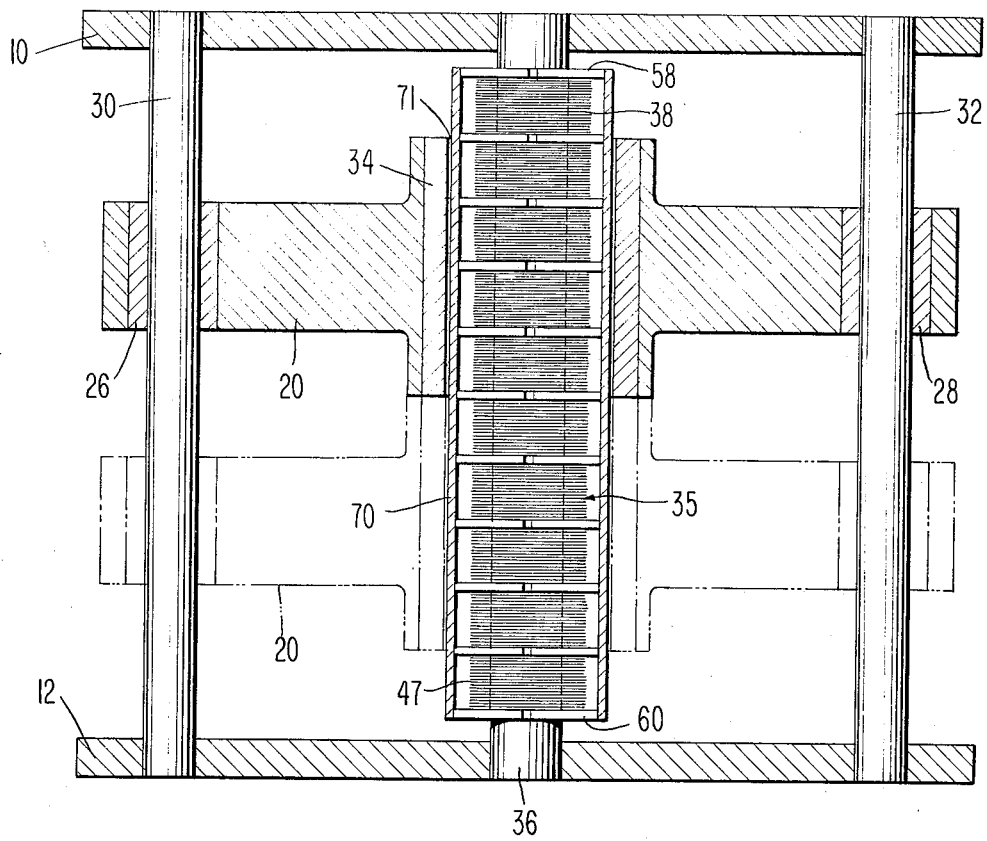
FIG. 2 is a sectional view taken on line 2—2 of FIG. 1.

Referring to FIGS. 1 and 2, the printing machine apparatus embodying the invention includes two side plates, or frame members 10 and 12, and a printing platen 14 around which is guided a record medium 16, which is usually paper. A printing mechanism illustrated diagrammatically by a type bar 18 is supported on a carriage 20 and is actuated by suitable means, forming no part of the present invention, so as to be propelled against an inking ribbon 22, and the inking ribbon 22 in turn forced against the record medium 16 to effect printing. In the present embodiment of the invention, the platen 14 is rotatable about the axis of its shaft 24 for line indexing and is fixed longitudinally in the direction parallel to such axis, while the carriage 20 carrying the printing mechanism 18 may be caused to longitudinally traverse the platen 14 during printing, by means of the present invention. An opposite arrangement may be found in the ordinary office typewriter in which the carriage supporting the typing elements is stationary and the platen carrying the paper record traverses the typing mechanism during its escapement movements. This latter type of arrangement and operation is also within the scope of the present invention. As will appear more clearly hereinafter, the invention may also be adapted for positioning or selecting type characters for printing.

The carriage 20 is provided with bearings 26 and 28 (FIG. 2), press-fitted or otherwise secured therein, which are mounted for sliding movement, respectively, on shafts or ways 30 and 32 each secured at its end regions in bores in the frame members 10 and 12. A cylindrical magnet 34, which, in this embodiment, is a permanent magnet, is press-fitted or otherwise secured in a bore in the carriage 20.

An electromagnet 35 comprises a core 36 secured at its end regions in bores in the frame members 10 and 12 and a plurality of individual interconnected coils 38–47 wound around the core 36. Each group of adjacent coils such as 39–42 for example, corresponding to the length of the magnet 34, represents a printing position along the axis of the platen shaft 24, and each printing position coil 39–46 has a length along this axis which is substantially equal to the spacing between printing positions.

Adjacent coils 38–47 are spaced or separated by means of an individual one of spacers 48–56 mounted on the core 36. Two end pieces 58 and 60, similar in construction to the spacers 48–56, are likewise mounted on the core 36. The spacers 48–56 and the end pieces 58 and 60 are provided with diametrically opposite openings 62 and 64 for, respectively, routing the ends of the coils 38–47 and the return loop 66 connecting the coils 38 and 47. The ends of adjacent coils 38–47 are interconnected at points 68 in the openings 62. All of the coils 38–47 are wound in the same hand or direction around the core 36. A cylindrical sleeve 70 is press-fitted or otherwise secured on the diameters of the spacers 48–56 and the end pieces 58 and 60, and forms a minimum gap 71 with the interior of the magnet 34, this gap 71 being greatly exaggerated in FIG. 4. The core 36, spacers 48–56, end pieces 58 and 60, and the sleeve 70 are constructed of a magnetic or ferromagnetic material, such as soft iron or steel.

Figure 4:
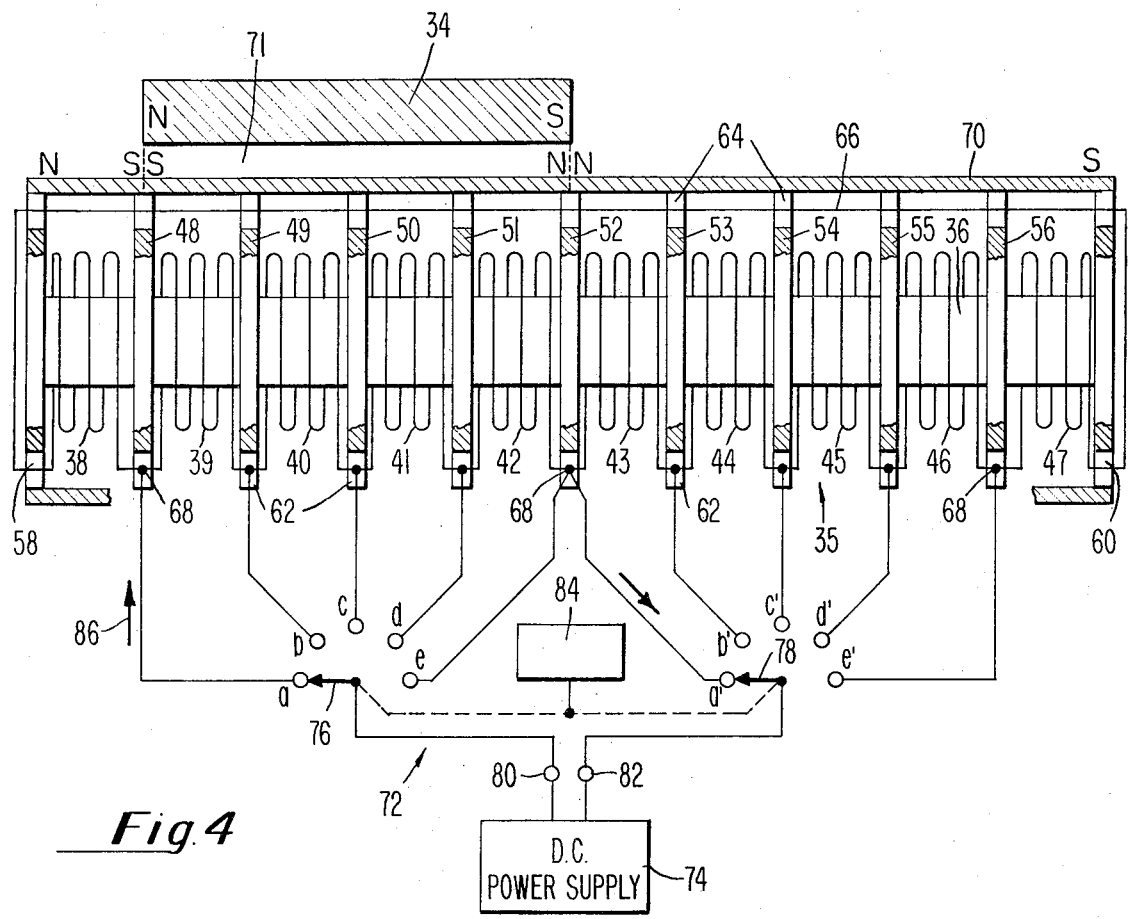
FIG. 4 is a diagrammatic fragmentary sectional view, partly schematic, showing the two magnets and the several interconnected coils of the electromagnet.

When the carriage 20 is at a given printing position relative to the platen 14, the ends or pole regions of the permanent magnet 34 will be in line with substantially the centerlines of a pair of the spacers 48–56 which may embrace within their inside faces one or more of the coils 39–46, depending upon the particular construction. Thus in the illustrated embodiment, as shown in FIG. 4, there are four coils 39–42 between the spacers 48 and 52, the spacers 48 and 52 being in line with the poles and the end faces of the permanent magnet 34. This number of coils between the spacers 48 and 52 is illustrative only since, as indicated previously, one or more coils 39–46 and a corresponding number of spacers may be used between the two spacers which at any printing position define the limits of the permanent magnet 34.

A double-deck rotary stepping switch 72 provides a means for selectively applying power to the interconnection points 68 from a source of power 74. In the present embodiment of the invention the power source 74 is a DC power supply.

The stepping switch 72 includes two banks of contacts a–e and a'–e', each of the contacts being connected through a suitable lead to one of the interconnection points 68. Two wiper contacts 76 and 78 are connected, respectively, through suitable leads to terminals 80 and 82 of the power supply 74.

In operation, the permanent magnet 34 and, therefore, the printing carriage 20 may be selectively positioned to any desired printing position by selectively energizing the coils 38–47. This is accomplished by manipulating the stepping switch 72 either manually or by means of power or automatically by means of a device illustrated diagrammatically by a block 84 so as to step the wipers 76 and 78 simultaneously.

Figure 3:
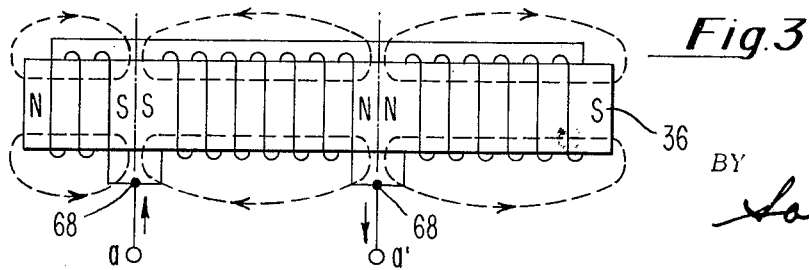
FIG. 3 is a simplified diagrammatic illustration of the generation of three magnetic fields when the electromagnet is energized.

Assuming that the stepping switch 72 has been actuated so that the wipers 76 and 78 make contact with the contacts a and a', as shown, and assuming further that current flow is in the direction of the arrow 86, the current will split at the interconnection 68 between coils 38 and 39 so that part of it will pass to the left into coil 38 and part of it to the right into coil 39. This will result in the creation of three magnetic fields, with their three north poles and three south poles identified by the letters N and S shown immediately above the sleeve 70 in FIG. 4. The three magnetic 34 fields are illustrated diagrammatically in FIG. 3 in which some of the coils, contacts and interconnection points have been omitted for purposes of simplification. The magnetic fields are generated as follows.

Current flowing leftwardly to coil 38 will generate a first magnetic field whose flux will flow leftwardly through the core 36, thence radially outwardly in the end piece 58, thence to the right through the sleeve 70, and will complete its return path to the core 36 through the spacer 48. Current flowing rightwardly into the coil 39 and thence through the coils 40, 41 and 42 and exiting through the interconnection point 68 between coils 42 and 43 to return to the power supply 74 via the contact a', the wiper 78 and the contact 82 will generate a second magnetic field whose flux will flow rightwardly from the region of the spacer 48 through the core 36, thence radially outwardly through the spacer 52, thence leftwardly through the sleeve 70, and will complete its return path to the core 36 through the spacer 48. Current leaving the coil 38 will flow through the return loop 66 and thence through coils 47, 46, 45, 44 and 43 to exit through the interconnection point 68 between coils 42 and 43 to return to the power source 74, also through the contact a', the wiper 78 and the contact 82 to generate a third magnetic field whose flux flows leftwardly from the vicinity of the end piece 60 through the core 36, thence radially outwardly through the spacer 52, thence rightwardly through the sleeve 70 to complete its path to the core 36 through the end piece 60.

Since the carriage 20 is free to move along the ways 30 and 32, the interaction of the flux lines from the permanent magnet 34 with the electromagnet flux lines, particularly in the spacers 48 and 52 at the south poles SS and the north poles NN, will cause the permanent magnet 34 to move from its previous position to the position shown in FIG. 4. Thus the interacting flux in the spacers 48 and 52 serves to center or magnetically detent the permanent magnet 34 and, therefore, the printing carriage 20 at the selected printing position. A similar action will take place whenever the stepping switch 72 is actuated so as to move the wipers 76 and 78 to another pair of contacts.

Figure 5:
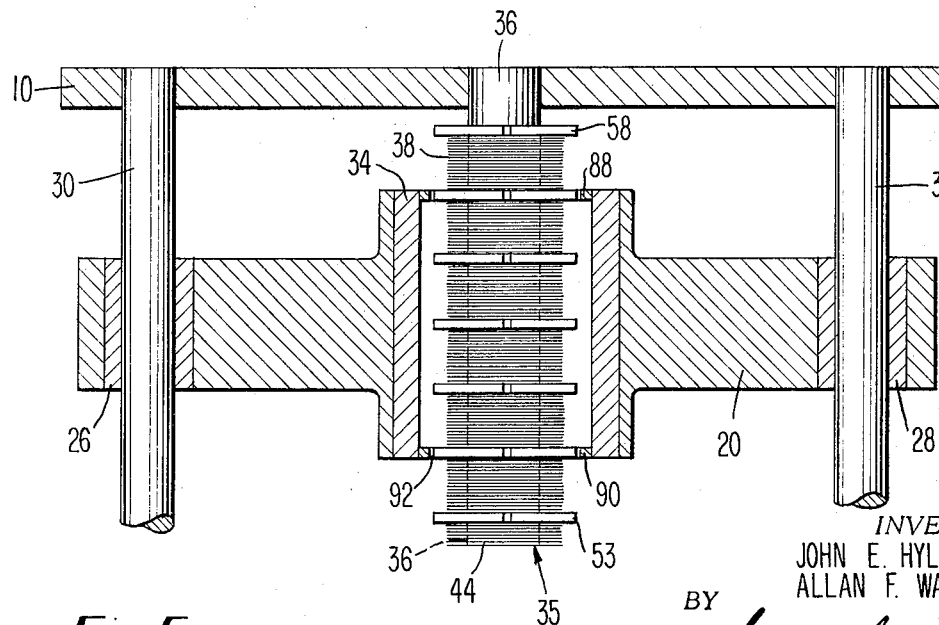
FIG. 5 illustrates a modification of the invention.

The above-described embodiment affords suitable detenting action whenever the spacing between printing positions is not close. However, it has been found that for close spacing of the printing positions, for example, 0.1 inch spacing in which the spacers 48–56 are also spaced 0.1 inch apart, better flux interaction and better detenting action can be obtained by omitting the sleeve 70 and fitting the inner ends of the permanent magnet 34 (FIG. 5) with annular magnetic inserts 88 and 90 secured therein whose inside dimension is such as to provide a minimum gap 92 with the spacers 48–56 and the end pieces 58 and 60.

We claim:

1. Apparatus for magnetically positioning and magnetically detenting a machine carriage at a selected one of a plurality of equally-spaced operating positions comprising an elongate cylindrical magnet having poles at its end regions, an elongate electromagnet telescopically mounted within said cylindrical magnet and comprising a magnetic core and a plurality of elongate operating position coils and two end coils wound around said magnetic core each energizable so as to be magnetically coupled to said cylindrical magnet and each operating position coil having a length substantially equal to the spacing between said operating positions, said coils being interconnected and with each end coil interconnected with an end of the interconnected operating position coils, one of said magnets being stationary and the other movable and mounted controllably moving said machine carriage, a plurality of magnetic disc-like spacers each in contact with and mounted on said magnetic core between adjacent coils so as to have its transverse centerline at one of said operating positions and at one of said interconnections, two magnetic end pieces similar to construction to said spacers and each in contact with and mounted on an end region of said magnetic core, a magnetic sleeve in contact with and encircling said spacers and said end pieces and disposed within said cylindrical magnet with a minimum gap therebetween and disposed between said cylindrical magnet and said electromagnet, said cylindrical magnet having its ends at any selected operating position in line with two selected spacers at said selected operating position and having a length whose dimension is a multiple of the dimension of the spacing between spacers, a plurality of contacts each tapped to one of said interconnections, a source of electrical energy, and means for simultaneously connecting the two contacts that are tapped to the two interconnections at said two selected spacers to said source of electrical energy so that the resulting magnetic flux interacts with the magnetic flux of said cylindrical magnet through said two selected spacers to cause relative movement between said cylindrical magnet and said electromagnet to magnetically position and magnetically detent said carriage at said selected operating position, and wherein said magnetic core, said magnetic sleeve, said magnetic end pieces and any two selected spacers form a closed magnetic circuit.

2. Apparatus according to claim 1 wherein each spacer and end piece is provided with two openings at its periphery, one opening in each spacer for routing an end of adjacent coils and for containing their interconnection, one opening in each end piece for routing and for containing an end of one of said end coils and an end of a return loop connecting said end coils, and the other opening in said spacers and in said end pieces for routing and for containing said return loop.

References Cited

UNITED STATES PATENTS

| | | | |
|---|---|---|---|
| 778,369 | 12/1964 | Morse | 197—66 |
| 956,798 | 5/1910 | Du Belle | 197—66 |
| 1,066,442 | 7/1913 | Vogel | 197—82 |
| 1,241,865 | 10/1917 | Lloyd | 197—66 |
| 1,278,324 | 9/1918 | Fraenzl | 197—66 |
| 1,342,940 | 6/1920 | Breuckman et al. | 197—66 |
| 2,029,957 | 2/1936 | Trachtenberg | 197—12 |
| 3,135,880 | 6/1964 | Olson et al. | 317—123 X |
| 3,183,410 | 5/1965 | Flora | 317—155.5 X |

ERNEST T. WRIGHT, Jr., Primary Examiner

U.S. Cl. X.R.

197—12, 66, 176